(12) United States Patent
Wang

(10) Patent No.: US 11,746,914 B2
(45) Date of Patent: Sep. 5, 2023

(54) ANTI-OVERFLOW PIPE

(71) Applicant: Beijing Shenchuang Century Information Technology Co., Ltd., Beijing (CN)

(72) Inventor: Hao Wang, Beijing (CN)

(73) Assignee: Beijing Shenchuang Century Information Technology Co., Ltd., Beijing (CN)

( * ) Notice: Subject to any disclaimer, the term of this patent is extended or adjusted under 35 U.S.C. 154(b) by 8 days.

(21) Appl. No.: 17/594,873

(22) PCT Filed: Aug. 16, 2019

(86) PCT No.: PCT/CN2019/101144
§ 371 (c)(1),
(2) Date: Nov. 2, 2021

(87) PCT Pub. No.: WO2020/237844
PCT Pub. Date: Dec. 3, 2020

(65) Prior Publication Data
US 2022/0252169 A1     Aug. 11, 2022

(30) Foreign Application Priority Data

May 27, 2019 (CN) .......................... 201910447527.1
May 27, 2019 (CN) .......................... 201920776856.6

(51) Int. Cl.
*F16K 15/14*     (2006.01)
(52) U.S. Cl.
CPC .................................. *F16K 15/147* (2013.01)
(58) Field of Classification Search
CPC ........... F16K 15/14–1481; F16K 17/34; Y10T 137/7879; Y10T 137/788; Y10T 137/7882;

(Continued)

(56) References Cited

U.S. PATENT DOCUMENTS 3,437,246 A * 4/1969 Clapp .................... B65D 83/14
                                          137/844
3,556,138 A * 1/1971 D'Urso ................. F16K 15/147
                                         137/516.25

(Continued)

FOREIGN PATENT DOCUMENTS

CN       202078043 U     12/2011
CN       207940562 U     10/2018

(Continued)

OTHER PUBLICATIONS

CNIPA, International Search Report issued in IA No. PCT/CN2019/101144, dated Mar. 6, 2020.

*Primary Examiner* — Kevin F Murphy
(74) *Attorney, Agent, or Firm* — LKGlobal | Lorenz & Kopf, LLP

(57) ABSTRACT

An anti-overflow pipe, comprising a pipe wall and a valve; on a plane perpendicular to the lengthwise direction of the pipe wall, the cross-section of the inner side wall of the pipe wall is oval, and the cross-section of the outer side wall of the pipe wall has a closed ring shape; in a plane where the major axis of the elliptical shape of the inner side wall and the lengthwise direction of the pipe wall are located, the cross-section of the valve is in a V-shaped structure and the valve is connected with the inner side wall, and the valve is provided with a slit for unidirectionally conducting fluid. The valve with a V-shaped structure is provided on the pipe wall having an oval cross-section, so that the fluid is sucked out under the action of suction, preventing waste of fluid, and scalding and wetting of a user, ensuring personal safety of a user.

20 Claims, 7 Drawing Sheets

(58) Field of Classification Search
CPC ........ Y10T 137/7885; Y10T 137/7727; B65D 47/2031
See application file for complete search history.

(56) References Cited

U.S. PATENT DOCUMENTS

| | | | |
|---|---|---|---|
| 5,730,336 A * | 3/1998 | Lerner | A45F 3/16 137/849 |
| 8,701,928 B2 * | 4/2014 | Samson | B65D 47/2031 220/717 |
| 9,668,599 B1 | 6/2017 | Ellsworth et al. | |
| 10,167,119 B2 * | 1/2019 | Wiesman | B65D 47/2031 |
| 2016/0235229 A1 * | 8/2016 | Löhn | B65D 47/06 |
| 2017/0156525 A1 * | 6/2017 | Guy | A47G 21/185 |

FOREIGN PATENT DOCUMENTS

| | | |
|---|---|---|
| CN | 110056671 A | 7/2019 |
| JP | 4360487 B2 | 11/2009 |

* cited by examiner

ANTI-OVERFLOW PIPE

CROSS-REFERENCE TO RELATED APPLICATIONS

This application is a U.S. National-Stage entry under 35 U.S.C. § 371 based on International Application No. PCT/CN2019/101144, filed Aug. 16, 2019, which was published under PCT Article 21(2) and which claims priority to Chinese Application No. 201910447527.1, filed May 27, 2019, and Chinese Application No. 201920776856.6, filed May 27, 2019, which are all hereby incorporated in their entirety by reference.

FIELD OF THE INVENTION

The present invention belongs to the technical field of fluid fittings, and specifically relates to an anti-overflow pipe,

BACKGROUND OF THE INVENTION

In the control of fluid flow, people hope that the fluid flow in the pipeline conforms to people's wishes, that is: when fluid flow is needed, the fluid flows in the pipeline in a specified direction; when fluid flow is not required, the fluid in the pipeline does not overflow or flow back, so as to avoid fluid waste and accidental personal injury.

At present, most of the straws in life are not equipped with structures to control the flow of fluid, but simple cavities. When used with a cup, after the cup is pressurized or due to the thermal expansion and contraction of the fluid, it is easy to cause the fluid to overflow along the straw, resulting in a waste of resources. Moreover, if the temperature of the fluid is high, the fluid quickly contacting with the human body is likely to cause burns. However, the existing straws do not have a structure to slow down the flow of the fluid, and there are hidden dangers during use.

SUMMARY

In order to solve the above problems, the present invention provides an anti-overflow pipe, and its technical solution is as follows:

an anti-overflow pipe comprises a pipe wall and a valve; on a plane perpendicular to lengthwise direction of the pipe wall, a cross-section of an inner side wall of the pipe wall is oval, the oval (elliptical shape) is symmetrical along the major (long) axis of the ellipse or asymmetrical along the major axis of the ellipse, that is, the elliptical shape is divided into two arcs by the straight line where the major axis of elliptical shape is located, and the curvatures of the two arcs can be the same or different; a cross-section of an outer side wall of the pipe wall has a closed ring shape; in a plane where major axis of elliptical shape of the inner side wall and lengthwise direction of the pipe wall are located, a cross-section of the valve is in a V-shaped structure, the valve is centrosymmetric about the origin of the elliptical shape of the cross-section of the inner side wall, and connected with the inner side wall, the valve is provided with a slit for unidirectionally conducting fluid.

As the above-mentioned anti-overflow pipe, further preferably: on a plane perpendicular to lengthwise direction of the pipe wall, a cross-section of outer side wall of the pipe wall is oval (elliptical), the oval origin of the cross-section of the outer side wall coincides with the oval origin of the cross-section of the inner side wall; along a curve direction of elliptical shape of the inner side wall, a wall thickness of the pipe wall gradually decreases from an end of minor (short) axis of elliptical shape to an end of major axis of elliptical shape.

As the above-mentioned anti-overflow pipe, further preferably: a ratio range of the wall thickness of the pipe wall at the end of the minor axis of elliptical shape to that of the pipe wall at the end of the major axis of elliptical shape ranges from 2 to 0.9-1.2.

As the above-mentioned anti-overflow pipe, further preferably: a length ratio of the major axis to the minor axis of elliptical shape of the cross-section of the inner side wall ranges from 5 to 3.5-4.5.

As the above-mentioned anti-overflow pipe, further preferably: in the plane where the major axis of the elliptical shape of the inner side wall and the lengthwise direction of the pipe wall are located, the top profile of the pipe wall is an arc-shaped (arc) curve with the middle part bent upwards.

As the above-mentioned anti-overflow pipe, further preferably: reinforcing ribs are arranged at the V-shaped sharp corners of the valve, and the reinforcing ribs are collinear with the minor axis of elliptical shape of the inner side wall, and two ends of the reinforcing rib are connected with the pipe wall and coincide with the minor axis of the cross-section of the elliptical shape.

As the above-mentioned anti-overflow pipe, further preferably: on the valve, the slit is provided in a middle of the reinforcing ribs, and lengthwise direction of the slit is the same as that of the reinforcing ribs.

As the above-mentioned anti-overflow pipe, further preferably: the top surface of the pipe wall is an arc surface, and the arc surface is in smooth transition with the inner side wall and the outer side wall of the pipe wall.

As the above-mentioned anti-overflow pipe, further preferably: a length of the valve from the top surface of the pipe wall ranges from 5 mm to 20 mm.

As the above-mentioned anti-overflow pipe, further preferably: the pipe wall and the valve are integrally arranged and made of thermoplastic elastomer material.

As the above-mentioned anti-overflow pipe, further preferably: V-shaped two side walls of the valve are flat.

As the above-mentioned anti-overflow pipe, further preferably: the V-shaped two side walls of the valve are arc-shaped curved surfaces with the center bent downwards.

It can be seen from the analysis that compared with the prior art, the advantages and beneficial effects of the present invention are:

1. When the anti-overflow pipe of the present invention is not subjected to suction, the slit is in a closed state, and the fluid is blocked at the valve and does not overflow. When the pipe wall is subjected to suction, the pipe wall is deformed, which in turn drives the valve to deform. When the valve is deformed, the V-shaped two side walls bend downwards, and the slit is bent, deformed and opened, thereby conducting the path through which the fluid flows. The fluid flows outward from the valve by suction. In the present invention, the valve with V-shaped structure is set on the pipe wall with the elliptical cross-section of the inner side wall, so that the fluid is sucked out under the action of suction, and will not overflow under the influence of thermal expansion or contraction or under the influence of cup pressure, preventing waste of fluid, and scalding and wetting of a user, ensuring personal safety of a user. At the same time, the valve of the present invention can achieve a buffering effect on the flowing of fluid, avoiding the hidden danger of excessively fast fluid flow, and also preventing the fluid outside the pipe wall from flowing into the pipe wall through the valve and causing fluid pollution.

2. In the present invention, the thickness of the pipe wall in the elliptical circumferential direction of the cross-section of the inner side wall gradually becomes thinner from the end of minor axis to the end of the major axis, which can ensure that the deformation of the pipe wall generated by the suction force includes that the pipe wall is compressed in the minor axis direction and expanded in the major axis direction, thereby controlling the deformation of the slit and accurately controlling the on-off of the fluid in the pipe.

3. In the plane where the major axis of elliptical shape of the inner side wall and the lengthwise direction of the pipe wall are located, the top profile of the pipe wall of the present invention is an arc-shaped curve with the middle part bent upward, which can further ensure that the deformation of the pipe wall generated by the suction force includes that the pipe wall is compressed in the minor axis direction and expanded in the major axis direction, thereby accurately controlling the deformation of the top of pipe wall.

4. The V-shaped sharp corners of the valve of the present invention are provided with reinforcing ribs, which can generate an outward force along the minor axis of elliptical shape on the pipe wall, ensuring the sealing effect of the valve. At the same time, it can also increase the fatigue life of the valve and increase the number of opening and closing of the slit on the valve, thereby increasing the life of the valve.

5. The top surface of the pipe wall of the present invention is an arc surface, which avoids the hidden danger of cuts caused by the edges and corners of the top surface to the user. The top surface is round and smooth, which is more consistent with the usage habits and can effectively improve the use somatosensory.

Figure 1:
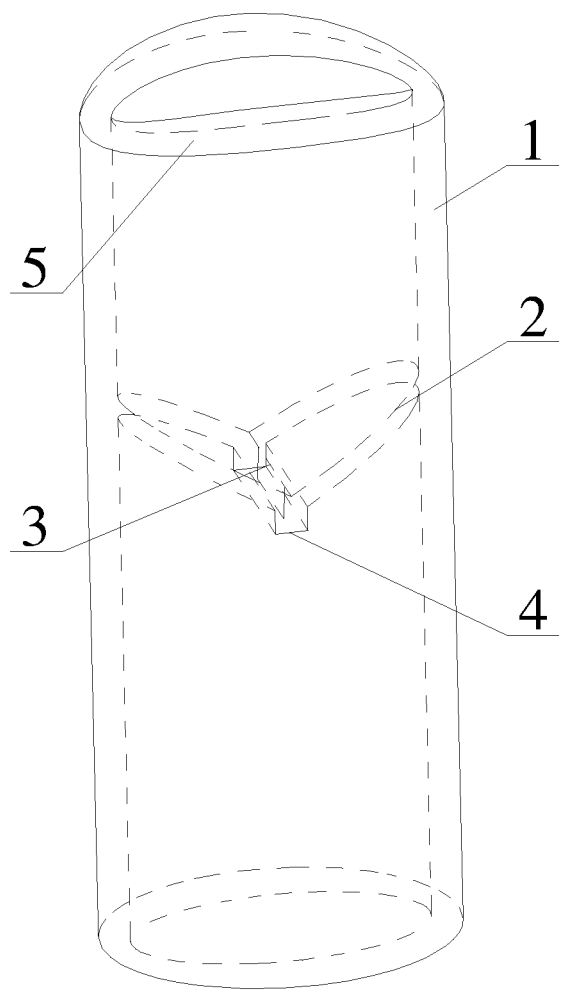
FIG. 1 is a structural schematic diagram of the anti-overflow pipe of the present invention.

In the figures: 1—pipe wall; 2—valve; 3—kerf; 4—reinforcing rib; 5—top surface.

DETAILED DESCRIPTION OF THE EMBODIMENTS

The technical solutions in the examples of the present invention will be described clearly and completely below with reference to the drawings in the examples. Obviously, the described examples are only part of the examples of the present invention, rather than all the examples. Based on the examples in the present invention, other examples which are obtained by those skilled in the art without creative work all fall within the protection scope of the present invention.

In the description of the present application, the orientation or positional relationship indicated by the terms "longitudinal", "transverse", "upper", "lower", "front", "rear", "left", "right", "vertical", "horizontal", "top", "bottom", etc. is based on the orientation or positional relationship shown in the drawings, only for the convenience of describing the present application rather than requiring the present application to be constructed and operated in a specific orientation, thus it cannot be understood as a limitation to the present application.

The terms "connected" or "connecting" used in the present application should be understood in a broad sense, for example, it can be a fixed connection or a demountable connection; it can be directly connected or indirectly connected via an intermediate component. Those skilled in the art can understand the specific meanings of the above terms according to specific situations.

Figure 2:
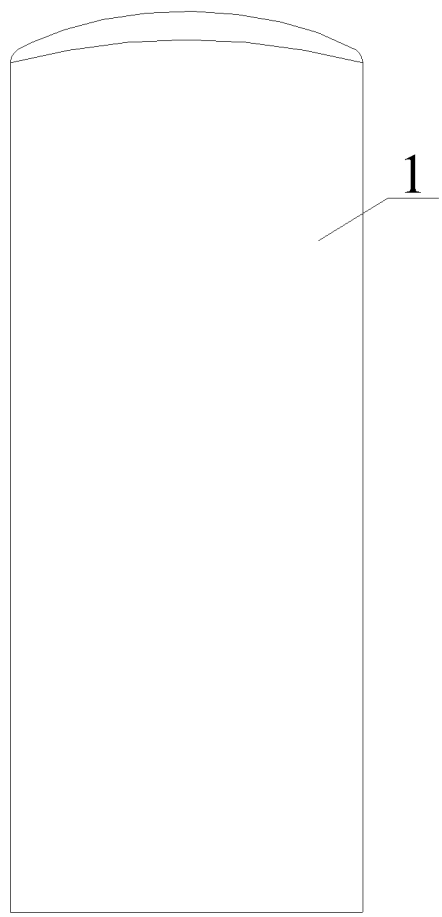
FIG. 2 is a front view of the anti-overflow pipe of the present invention.
Figure 3:
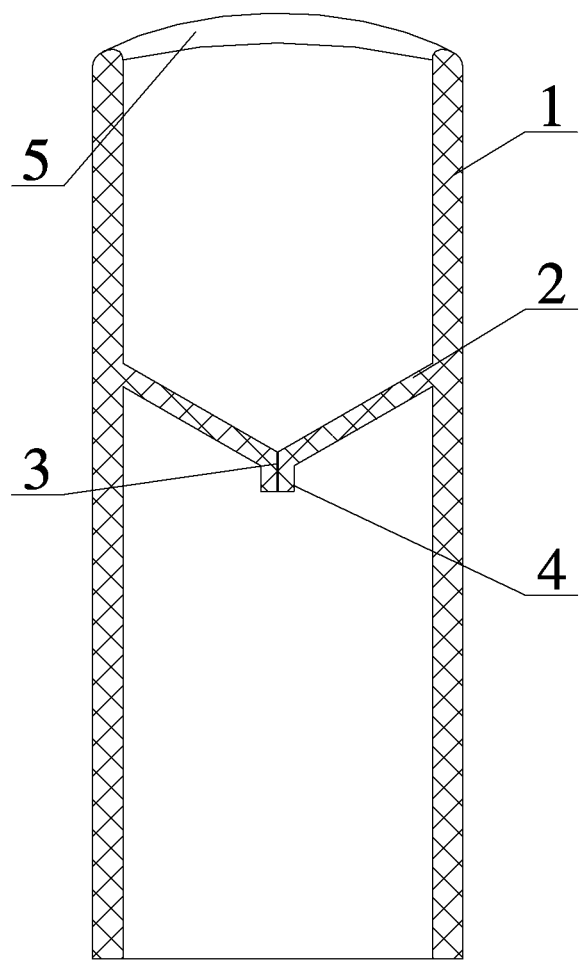
FIG. 3 is a cross-sectional view of FIG. 2.
Figure 4:
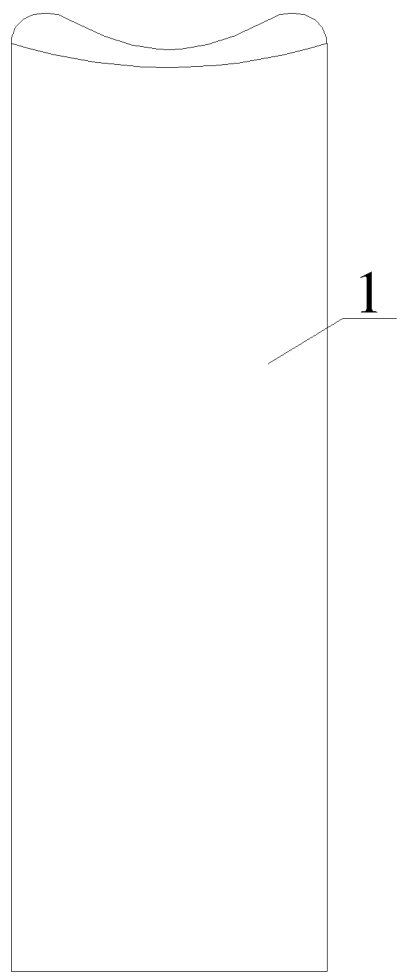
FIG. 4 is a side view of the anti-overflow pipe of the present invention.
Figure 5:
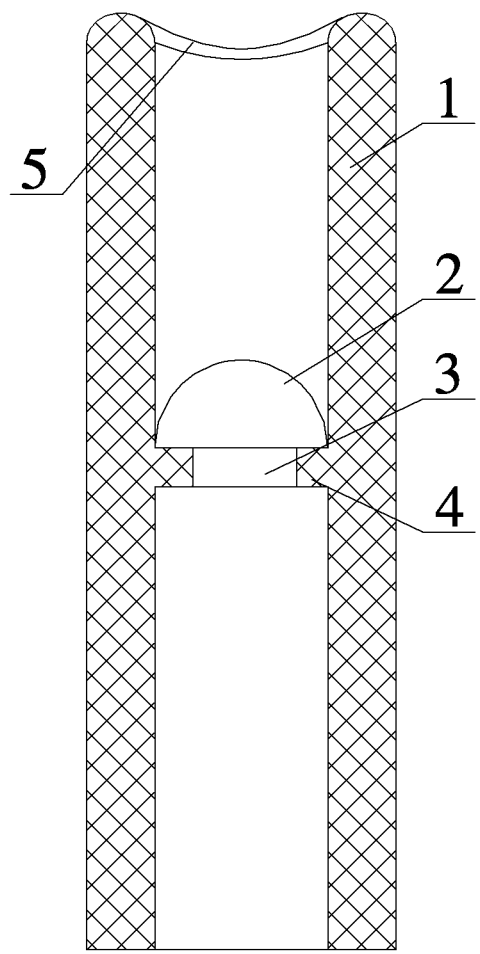
FIG. 5 is a cross-sectional view of FIG. 4.
Figure 6:
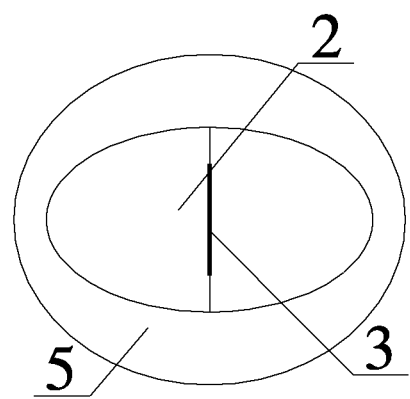
FIG. 6 is a top view of the anti-overflow pipe of the present invention.
Figure 7:
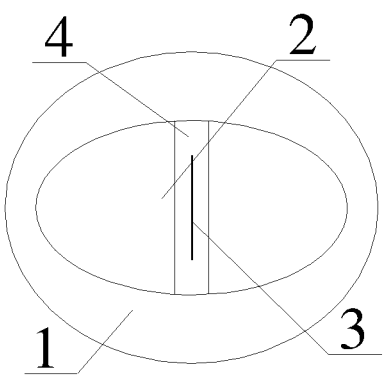
FIG. 7 is a bottom view of the anti-overflow pipe of the present invention.
Figure 8:
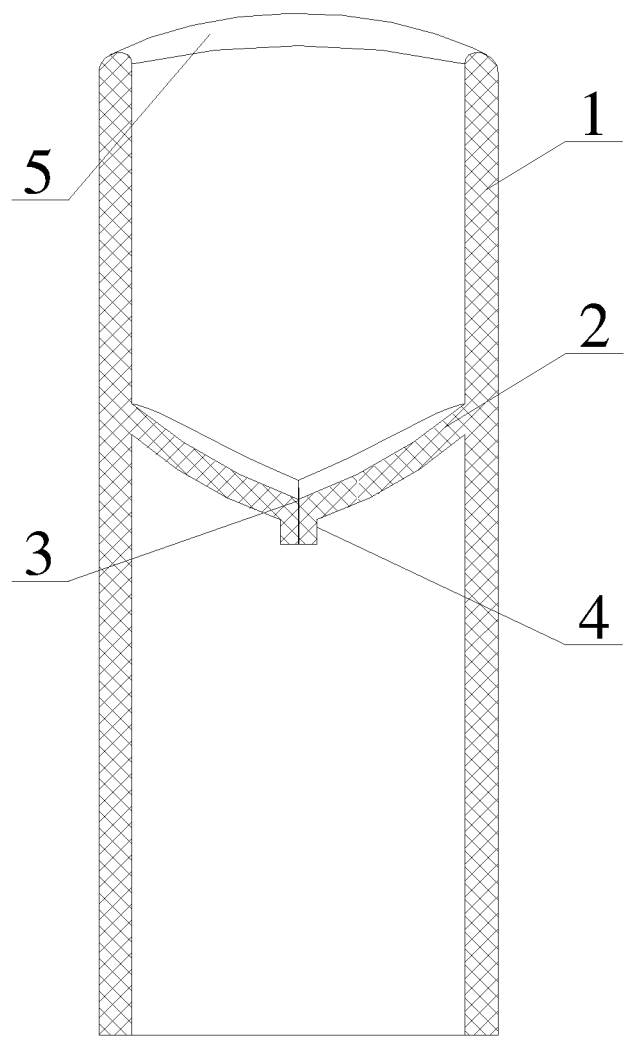
FIG. 8 is a schematic diagram when the valve is an arc-shaped curved surface.
Figure 9:
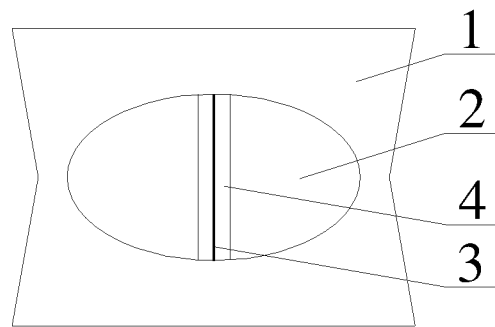
FIG. 9 is a second structural schematic diagram of the anti-overflow pipe of the present invention.
Figure 10:
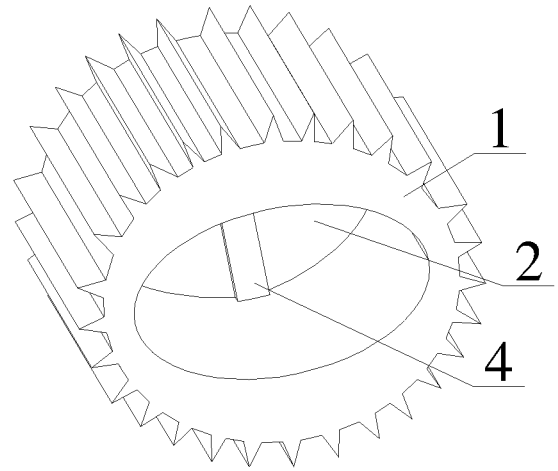
FIG. 10 is a third structural schematic diagram of the anti-overflow pipe of the present invention.
Figure 11:
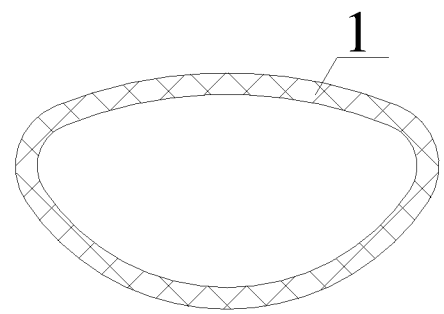
FIG. 11 is a fourth structural schematic diagram of the anti-overflow pipe of the present invention.

Referring to FIGS. 1 to 11, where FIG. 1 is a structural schematic diagram of the anti-overflow pipe of the present invention; FIG. 2 is a front view of the anti-overflow pipe of the present invention; FIG. 3 is a cross-sectional view of FIG. 2; FIG. 4 is a side view of the anti-overflow pipe of the present invention; FIG. 5 is a cross-sectional view of FIG. 4; FIG. 6 is a top view of the anti-overflow pipe of the present invention; FIG. 7 is a bottom view of the anti-overflow pipe of the present invention; FIG. 8 is a schematic diagram when the valve is an arc-shaped curved surface; FIG. 9 is a second structural schematic diagram of the anti-overflow pipe of the present invention; FIG. 10 is a third structural schematic diagram of the anti-overflow pipe of the present invention; FIG. 11 is a fourth structural schematic diagram of the anti-overflow pipe of the present invention.

As shown in FIG. 1, FIG. 9, FIG. 10 and FIG. 11, the present invention provides an anti-overflow pipe, which mainly includes the pipe wall 1 and the valve 2. On a plane perpendicular to lengthwise direction of the pipe wall, a cross-section of an inner side wall of the pipe wall 1 is elliptical, the elliptical shape is symmetrical along the major axis of the ellipse or asymmetrical along the major axis of the ellipse, that is, the elliptical shape is divided into two arcs by the straight line where the major axis of elliptical shape is located, and the curvatures of the two arcs are the same or different; a cross-section of an outer side wall of the pipe wall 1 has a closed ring shape; in a plane where major axis of elliptical shape of the inner side wall and lengthwise direction of the pipe wall 1 are located, a cross-section of the valve 2 is a V-shaped structure, the valve 2 is centrosymmetric about the origin of the elliptical shape of the cross-section of the inner side wall, and connected with the inner side wall, the slit 3 is provided in the valve 2 for unidirectionally conducting fluid.

Specifically, as shown in FIG. 1, FIG. 9 and FIG. 10, in an example of the present invention, the cross-section of the inner side wall of the pipe wall 1 is elliptical, and the elliptical shape is symmetrical along the major axis of the ellipse, that is, the elliptical shape is divided into two arcs by the straight line where the major axis of elliptical shape is located, and the curvatures of the two arcs are the same; a cross-section of the valve 2 is a V-shaped, and the slit 3 is provided in the valve 2. When the anti-overflow pipe is not subjected to suction, the slit 3 are in a closed state, and the fluid is blocked at the valve 2 and does not overflow. When the pipe wall 1 is subjected to suction, the pipe wall 1 deforms (the pipe wall 1 is compressed in the minor axis direction of the elliptical shape, and expanded in the major axis direction of the elliptical shape), which in turn drives the valve 2 to deform. When the valve 2 deforms, the two side walls of V-shape are bent downwards, and the slit 3 is bent and deformed to opened, thereby conducting the path through which the fluid flows. The fluid flows outward from the valve 2 by suction. In the present invention, the valve 2 with V-shaped structure is set on the pipe wall 1 with the elliptical cross-section of the inner side wall, so that the fluid is sucked out under the action of suction, and will not overflow under the influence of thermal expansion or contraction, or under the influence of cup pressure, preventing waste of fluid, and scalding and wetting of a user, ensuring personal safety of a user. At the same time, the valve 2 of the present invention can achieve a buffering effect on the flowing of fluid, avoiding the hidden danger of excessively fast fluid flow, and also preventing the fluid outside the pipe wall 1 from flowing into the pipe wall 1 through the valve 2 and causing fluid pollution. The cross-section of the outer side wall of the pipe wall 1 of the present invention has a closed ring shape, the shape of the closed ring is not specifically limited, providing that the pipe wall 1 is compressed under the action of suction in the minor axis direction of the elliptical shape and expanded in the major axis direction of the elliptical shape of the cross-section of the inner side wall. Specifically, as shown in FIG. 1, the cross-section of the outer side wall of the present invention can be elliptical, which increases the comfort of the user during use. As shown in FIG. 9, the cross-section of the outer side wall of the present invention can be a concave polygon with two reflex angles. The center line direction of the two reflex angles coincides with the major axis direction of elliptical shape of the cross-section of the inner side wall. When suction is applied, the angles of the two reflex angles of the outer side wall become larger, and the pipe wall 1 deforms, prompting slit 3 to open and conduct the fluid. As shown in FIG. 10, the cross-section of the outer side wall of the present invention can also be an ellipse with serrations (saw teeth) at which air can be circulated when it inserted into the sealing film of the fluid (for example, the beverages with the sealing film to which it is applied) to reduce the suction force when the fluid is sucked. As shown in FIG. 11, in another example of the present invention, the cross-section of the inner side wall of the pipe wall 1 is elliptical, and the elliptical shape is asymmetric along the major axis of the ellipse, that is, the elliptical shape is divided into two arcs by the straight line where the major axis of elliptical shape is located, and the curvatures of the two arcs are different.

When in use, the present invention does not specifically limit the type of fluid, and it can be widely used in the conduction of fluid flow. The fluid type can be gas, liquid, or colloid. At the same time, the present invention does not limit the length of the pipe wall 1. The pipe wall 1 can be inserted into the cup body separately, can also be assembled on the end of the pipeline, or assembled on the bottle cap for use. For example, when applied to the conduction of colloids, the present invention can be assembled on a feeding bottle and used as a nipple to prevent babies from choking and scalding; when applied to conduction of liquids, the present invention can be assembled on a travel mug, which is convenient for outdoor use, and avoids accidental spillage of water; when applied to the conduction of gas, the present invention can be assembled on the oxygen pipe and used in conjunction with the patient's breathing to avoid excessive oxygen overflow and waste.

As an improvement to the present invention, as shown in FIGS. 1 to 11, the present invention also provides the following improved solutions:

In order to accurately control the on-off of the fluid in the pipe, as shown in FIG. 6 and FIG. 7, on a plane perpendicular to lengthwise direction of the pipe wall 1, a cross-section of outer side wall of the pipe wall 1 is elliptical, the elliptical origin of the cross-section of the outer side wall coincides with the elliptical origin of the cross-section of the inner side wall; along an curve direction of elliptical shape of the inner side wall, a wall thickness of the pipe wall 1 gradually decreases from an end of minor axis of elliptical shape to an end of major axis of elliptical shape. Preferably, a ratio range of the wall thickness of the pipe wall 1 at the end of the minor axis of elliptical shape to the wall thickness of the pipe wall 1 at the end of the major axis of elliptical shape ranges from 2 to 0.9-1.2. Further, a length ratio of the major axis to the minor axis of elliptical shape of the cross-section of the inner side wall ranges from 5 to 3.5-4.5. In the present invention, the thickness of the pipe wall 1 in the elliptical circumferential direction gradually becomes thinner from the end of minor axis to the end of the major axis, which can ensure that the deformation of the pipe wall 1 generated by the suction force includes that the pipe wall is compressed in the minor axis direction and expanded in the major axis direction of elliptical shape, thereby controlling the deformation of the slit 3 and accurately controlling the on-off of the fluid in the pipe.

In order to accurately control the deformation state of the top of the pipe wall 1 when sucked, as shown in FIGS. 2 to 5, in the plane where the major axis of elliptical shape of the inner side wall and the lengthwise direction of the pipe wall 1 are located, the top profile of the pipe wall 1 is an arc-shaped curve with the middle part bent upwards, in combination with the design that the thickness of the pipe wall 1 in the elliptical circumferential direction gradually becomes thinner from the end of minor axis to the end of the major axis in the present invention, which can further ensure that the deformation of the pipe wall 1 generated by the suction force includes that the pipe wall is compressed in the minor axis direction and expanded in the major axis direction of the elliptical shape, thereby accurately controlling the deformation of the top of pipe wall 1.

In order to improve the sealing effect and service life of the valve 2, as shown in FIG. 1 and FIG. 3, the V-shaped sharp corners of the valve 2 are provided with reinforcing ribs 4, and both ends of the reinforcing ribs 4 are connected with the pipe wall 1 and coincide with the minor axis of the cross-section of the elliptical shape of the pipe wall 1. When in use, the pipe wall 1 is deformed by suction, and the valve 2 is subjected to the pressure of the pipe wall 1 to open the slit 3 and conduct the fluid. At this time, the reinforcing ribs 4 deform and bend with the deformation of the valve 2. When the suction stops, the pipe wall 1 rebounds, the slit 3 is closed, and the reinforcing ribs 4 rebounds. When the reinforcing ribs 4 rebounds, an outward force is exerted on the pipe wall 1 along the minor axis direction of the elliptical shape, which can compensate the rebound of pipe wall 1 to a certain extent when the pipe wall 1 does not rebound in place, so as to ensure the sealing effect of the valve 2. At the same time, by setting the reinforcing ribs 4 on the V-sharp corners of the valve 2, the present invention can increase the fatigue life of the valve 2, and increase the number of opening and closing times of the slit 3 on the valve 2, thereby increasing the service life of the valve 2.

In order to facilitate the control of the fluid flow rate and the sealing effect of the valve 2, as shown in FIG. 3, FIG. 5, FIG. 8 and FIG. 9, the valve 2 of the present invention is provided with slit 3 in the middle of the reinforcing ribs 4. The lengthwise direction of the slit 3 is the same as that of the reinforcing ribs 4, which can ensure that the slit 3 and the reinforcing ribs 4 are deformed synchronously, and improve the sealing effect of the valve 2. Further, the length of slit 3 is not greater than the length of reinforcing ribs 4.

In order to improve the sense of use, as shown in FIG. 1, FIG. 2 and FIG. 4, the top surface 5 of the pipe wall 1 is an arc surface, and the arc surface is in smooth transition with the inner side wall and the outer side wall of the pipe wall 1, which avoids the hidden danger of cuts caused by the edges and corners of the top surface 5 to the user. The top surface 5 is round and smooth, which is more consistent with the usage habits and can effectively improve the use somatosensory.

In order to facilitate the user to suck fluid, as shown in FIG. 3 and FIG. 5, the length of the valve 2 from the top surface 5 of the pipe wall 1 (the highest point on the valve 2 and the lowest point on the top surface 5 of the pipe wall 1) ranges from 5 mm to 20 mm, which is convenient for the valve2 to deform with the deformation of the pipe wall 1, and can reduce the suction force when the user sucks fluid, and facilitate the flow of the fluid when the suction force is applied.

In order to facilitate processing and assembly, as shown in FIGS. 3 and 5, the pipe wall 1 and the valve 2 of the present invention are integrated and made of thermoplastic elastomer material, which is convenient for processing. Further, the pipe wall 1, the valve 2, and the reinforcing ribs 4 of the present invention are made of silica gel material through a vulcanization process, and the silica gel used has a Shore hardness value ranging from 30 to 80, which can ensure the repeated deformation of slit3 under the action of suction.

In order to facilitate flexible design according to materials, as shown in FIGS. 1, 3 and 8, in the present invention, the shape of the valve 2 can be in a variety of styles, which is not limited in the present invention. Specifically, as shown in FIGS. 1 and 3, V-shaped side walls of the valve 2 (that is, the two surfaces of both sides of the reinforcing ribs 4 on the valve 2) are flat. As shown in FIG. 8, the V-shaped side walls of the valve 2 (that is, the two surfaces of both sides of the reinforcing ribs 4 on the valve 2) an arc-shaped curved surface with the middle part bent downward. The arc-shaped curved surface is more susceptible to deform than the flat surface, thus the shape of the valve 2 can be selected to match the material and hardness of the valve 2. As the hardness of the material increases, thermoplastic elastomers are less prone to deformation. For example, taking silica gel as an example, and using the Shore hardness A value of 70 as the boundary, an arc-shaped curved surface is used when the value is higher than 70, and a flat surface is used when the value is lower than 70.

It can be known from technical common knowledge that the present invention can be implemented by other embodiments that do not deviate from its spirit or essential features. Therefore, the above-disclosed embodiments are merely illustrative in all aspects, and not exclusive. All changes within the scope of the present invention or within the scope equivalent to the present invention are encompassed by the present invention.

What is claimed is:

1. An anti-overflow pipe, characterized by comprising:
   a pipe wall and a valve;
   on a plane perpendicular to lengthwise direction of the pipe wall, a cross-section of an inner side wall of the pipe wall is an elliptical shape, a cross-section of an outer side wall of the pipe wall has a closed elliptical shape; in a plane where a major axis of the elliptical shape of the inner side wall and lengthwise direction of the pipe wall are located, a cross-section of the valve is a V-shaped structure and the valve is connected with the inner side wall, the valve is provided with a slit for unidirectionally conducting fluid; and
   on a plane perpendicular to lengthwise direction of the pipe wall, a cross-section of the outer side wall of the pipe wall is an elliptical shape, the oval origin of the cross-section of the outer side wall coincides with the oval origin of the cross-section of the inner side wall, wherein, said oval origin refers to an intersection of the major axis with the minor axis of the elliptical shape; along a curve direction of the elliptical shape of the inner side wall, a wall thickness of the pipe wall gradually decreases from an end of a minor axis of the elliptical shape to an end of the major axis of the elliptical shape.

2. The anti-overflow pipe according to claim 1, characterized in that,
   a ratio range of the wall thickness of the pipe wall at the end of the minor axis of the elliptical shape to the wall thickness of the pipe wall at the end of the major axis of the elliptical shape ranges from 2:0.9 to 2:1.2.

3. The anti-overflow pipe according to claim 2, characterized in that,
   a V-shaped two side walls of the valve are flat.

4. The anti-overflow pipe according to claim 2, characterized in that,
   a V-shaped two side walls of the valve are arc-shaped curved surfaces with a center bent downwards.

5. The anti-overflow pipe according to claim 1, characterized in that,
   a length ratio of the major axis to the minor axis of the elliptical shape of the cross-section of the inner side wall ranges from 5:3.5 to 5:4.5.

6. The anti-overflow pipe according to claim 1, characterized in that,
   in the plane where the major axis of the elliptical shape of the inner side wall and the lengthwise direction of the pipe wall are located, a top profile of the pipe wall is an arc-shaped curve with a middle part bent upwards.

7. The anti-overflow pipe according to claim 6, characterized in that,
   a V-shaped two side walls of the valve are flat.

8. The anti-overflow pipe according to claim 6, characterized in that,
   a V-shaped two side walls of the valve are arc-shaped curved surfaces with a center bent downwards.

9. The anti-overflow pipe according to claim 1, characterized in that,
   reinforcing ribs are arranged at V-shaped sharp corners of the valve, and the reinforcing ribs are collinear with the minor axis of the elliptical shape of the inner side wall, and two ends of each reinforcing rib are connected with the pipe wall.

10. The anti-overflow pipe according to claim 9, characterized in that,
    on the valve, the slit is provided in a middle of the reinforcing ribs, and lengthwise direction of the slit is the same as that of the reinforcing ribs.

11. The anti-overflow pipe according to claim 10, characterized in that,
a V-shaped two side walls of the valve are flat.

12. The anti-overflow pipe according to claim 9, characterized in that,
a V-shaped two side walls of the valve are flat.

13. The anti-overflow pipe according to claim 9, characterized in that,
a V-shaped two side walls of the valve are arc-shaped curved surfaces with a center bent downwards.

14. The anti-overflow pipe according to claim 1, characterized in that,
a top surface of the pipe wall is an arc surface, and the arc surface is in smooth transition with the inner side wall and the outer side wall of the pipe wall.

15. The anti-overflow pipe according to claim 14, characterized in that,
a V-shaped two side walls of the valve are flat.

16. The anti-overflow pipe according to claim 14, characterized in that,
a V-shaped two side walls of the valve are arc-shaped curved surfaces with a center bent downwards.

17. The anti-overflow pipe according to claim 1, characterized in that,
a length of the valve from a top surface of the pipe wall ranges from 5 mm to 20 mm.

18. The anti-overflow pipe according to claim 1, characterized in that,
the pipe wall and the valve are integrated and made of thermoplastic elastomer material.

19. The anti-overflow pipe according to claim 1, characterized in that,
a V-shaped two side walls of the valve are flat.

20. The anti-overflow pipe according to claim 1, characterized in that,
a V-shaped two side walls of the valve are arc-shaped curved surfaces with a center bent downwards.

* * * * *